(12) United States Patent
Mainville et al.

(10) Patent No.: US 8,220,769 B2
(45) Date of Patent: Jul. 17, 2012

(54) SYSTEM FOR TRANSPORTING A GAS TURBINE ENGINE

(75) Inventors: Daniel Mainville, Longueuil (CA); Alessandro Faraci, Anjou (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1379 days.

(21) Appl. No.: 11/755,833

(22) Filed: May 31, 2007

(65) Prior Publication Data

US 2008/0296469 A1    Dec. 4, 2008

(51) Int. Cl.
*F16M 1/00*     (2006.01)
*A01D 90/00*    (2006.01)
*B65F 3/00*     (2006.01)

(52) U.S. Cl. ........ 248/646; 248/651; 248/660; 248/676; 414/340; 414/539; 414/572; 187/250

(58) Field of Classification Search .................. 248/157, 248/346.01, 554, 637, 639, 646, 651, 654, 248/660, 675, 676, 677, 678; 414/340, 343, 414/539, 546, 556, 584, 572, 589, 592, 590, 414/401, 402, 408, 421, 405, 458, 461; 212/326, 212/327, 901; 415/1, 126, 213.1; 187/203, 187/213, 250; 254/124
See application file for complete search history.

(56) References Cited

U.S. PATENT DOCUMENTS

| | | | |
|---|---|---|---|
| 2,825,477 A | 3/1958 | Ross | |
| 3,087,630 A | 4/1963 | Karnow et al. | |
| 1,237,372 A | 6/1971 | Weekley | |
| 3,759,091 A | 9/1973 | Reimer | |
| 4,402,108 A | 9/1983 | Pannwitz | |
| 4,996,738 A | 3/1991 | Tifre | |
| 5,053,687 A | 10/1991 | Merlet | |
| 5,170,662 A | 12/1992 | Brault et al. | |
| 5,211,526 A | 5/1993 | Robinette | |
| 5,259,234 A | 11/1993 | Keller et al. | |
| 5,383,652 A | 1/1995 | Van Den Berg | |
| 5,396,791 A | 3/1995 | Mollmann et al. | |
| 5,451,134 A | 9/1995 | Bryfogle | |
| 5,575,607 A | 11/1996 | Grout et al. | |
| 5,653,351 A | 8/1997 | Grout et al. | |
| 5,722,512 A | 3/1998 | Lilja et al. | |
| 5,816,367 A | 10/1998 | Lilja et al. | |
| 5,833,424 A | 11/1998 | Bales | |
| 6,092,621 A | 7/2000 | Kinzie | |
| 6,167,795 B1 * | 1/2001 | Bayne et al. | .................. 414/408 |
| 6,276,665 B1 | 8/2001 | Hawkins et al. | |

(Continued)

FOREIGN PATENT DOCUMENTS

EP    1215119    6/2002

(Continued)

OTHER PUBLICATIONS

European Search Report from EP 08251884.

(Continued)

*Primary Examiner* — Tan Le
(74) *Attorney, Agent, or Firm* — Norton Rose Canada LLP

(57) ABSTRACT

A transport system suited for transporting a turbine engine mounted to an engine docking unit is provided. The transport system is capable of adjusting the attitude of the docking unit in at least the lateral and longitudinal directions relative to the engine to facilitate the loading and unloading of the turbine engine to and from the transport system.

17 Claims, 14 Drawing Sheets

U.S. PATENT DOCUMENTS

| | | | |
|---|---|---|---|
| 6,485,247 B1 * | 11/2002 | Groves et al. | 414/589 |
| 6,546,616 B2 * | 4/2003 | Radowick | 29/720 |
| 7,103,952 B2 | 9/2006 | Appleton et al. | |
| 7,402,130 B1 * | 7/2008 | Sjostedt et al. | 493/413 |
| 7,676,865 B2 * | 3/2010 | Graham et al. | 248/158 |
| 7,735,363 B2 * | 6/2010 | Mainville | 73/116.03 |
| 7,861,579 B2 * | 1/2011 | Mainville | 73/112.01 |
| 2001/0026756 A1 * | 10/2001 | Mortimore | 414/556 |
| 2003/0063968 A1 * | 4/2003 | Zaun et al. | 414/546 |
| 2003/0131444 A1 | 7/2003 | Koguchi | |
| 2005/0198797 A1 * | 9/2005 | Appleton et al. | 29/401.1 |

FOREIGN PATENT DOCUMENTS

GB    2 384 058    7/2003

OTHER PUBLICATIONS

Products and Services, Aerospace Testing International, Dec. 2006.

"Dallas Airmotive Expands PW300 and PW500 Service" by David A. Lombardo, Dec. 1, 2005. Maintenance and Modifications, Dassault.Falcon.

* cited by examiner

SYSTEM FOR TRANSPORTING A GAS TURBINE ENGINE

TECHNICAL FIELD

The invention relates generally to a transport system for transporting and manipulating a gas turbine engine.

BACKGROUND OF THE ART

An aero gas turbine engine is typically transported to a test cell using an overhead trolley system which requires strict safety procedures to be followed during its operation and particularly during the transfer of the engine from the build stand to the overhead trolley system. The operator of the overhead trolley system must also exercise extreme care while transporting and manually manipulating the turbine engine so as not to damage any parts of the engine while, for example, docking the engine to the test cell. Such overhead trolley systems require relatively large assembly/testing plants and greatly limit any floor layout reconfiguration of the engine assembly/testing plants.

Floor mobile systems have also been used in the past for transporting engines, but they generally have large footprints and still require other intermediate transition systems to handle the engines from the build stand to the docking system and to connect the docking system to the test bench. The transfer of the engine from the floor mobile system to such intermediate transition systems results in extra manipulation steps and, thus, increases the likelihood of the engine being damaged.

There is thus a need for a new transport system which offers a better control of the load transfer process of the gas turbine engine to and from the transport system and which facilitates and minimize the engine manipulations.

SUMMARY

Accordingly, it is an object of the present invention to provide a gas turbine engine transport system.

According to one broad aspect there is provided a transport system for transporting a gas turbine engine comprising: a support frame movably supported on a floor surface by at least one floor engaging member; a support member articulated to the support frame, the support member having a mounting portion for releasable engagement with a counterpart mounting portion provided on the gas turbine engine; at least a first actuator operatively connected between the support frame and the support member for causing the support member to rotate about a first axis; at least a second actuator operatively connected between the support frame and the support member for causing the support member to rotate about a second axis; and a load monitoring unit for measuring and providing feedbacks on reaction forces on the support member.

According to another aspect, there is provided a transport system for transporting a turbine engine mounted to an engine docking unit, the transport system comprising: a movable support frame supported on a floor surface by at least one floor engaging member; a support member pivotally connected to the support frame in an upright position wherein the support member is pivotable from the upright position about a first axis and a second axis; an upper portion of the support member having one of a male mounting portion and a female mounting portion mating to a counterpart mounting portion on the engine docking unit, the male and female mounting portions cooperating to prevent angular movements of the engine docking unit relative to the support member while allowing free axial disengagement of the engine docking unit from the support member in an upward direction; and means for pivoting said support member about at least said first and second axes.

According to a further aspect, there is provided a method for transferring a gas turbine engine from a carrying structure to which the gas turbine engine is mounted to a receiving structure, wherein one of the carrying structure and the receiving structure is secured to a support member articulated to a support frame which is movably supported on a floor surface, the method comprising the steps of:

a) actuating the support member so as to position the receiving structure and the carrying structure in a relative position suitable for fastening the gas turbine engine to the receiving structure;

b) fastening the gas turbine engine to the receiving structure;

c) actuating the support member while simultaneously monitoring a magnitude and direction of a reaction force on the support member until the magnitude and direction of the reaction force indicates that the gas turbine engine is entirely supported by the receiving structure; and d) unfastening the gas turbine engine from the carrying structure.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
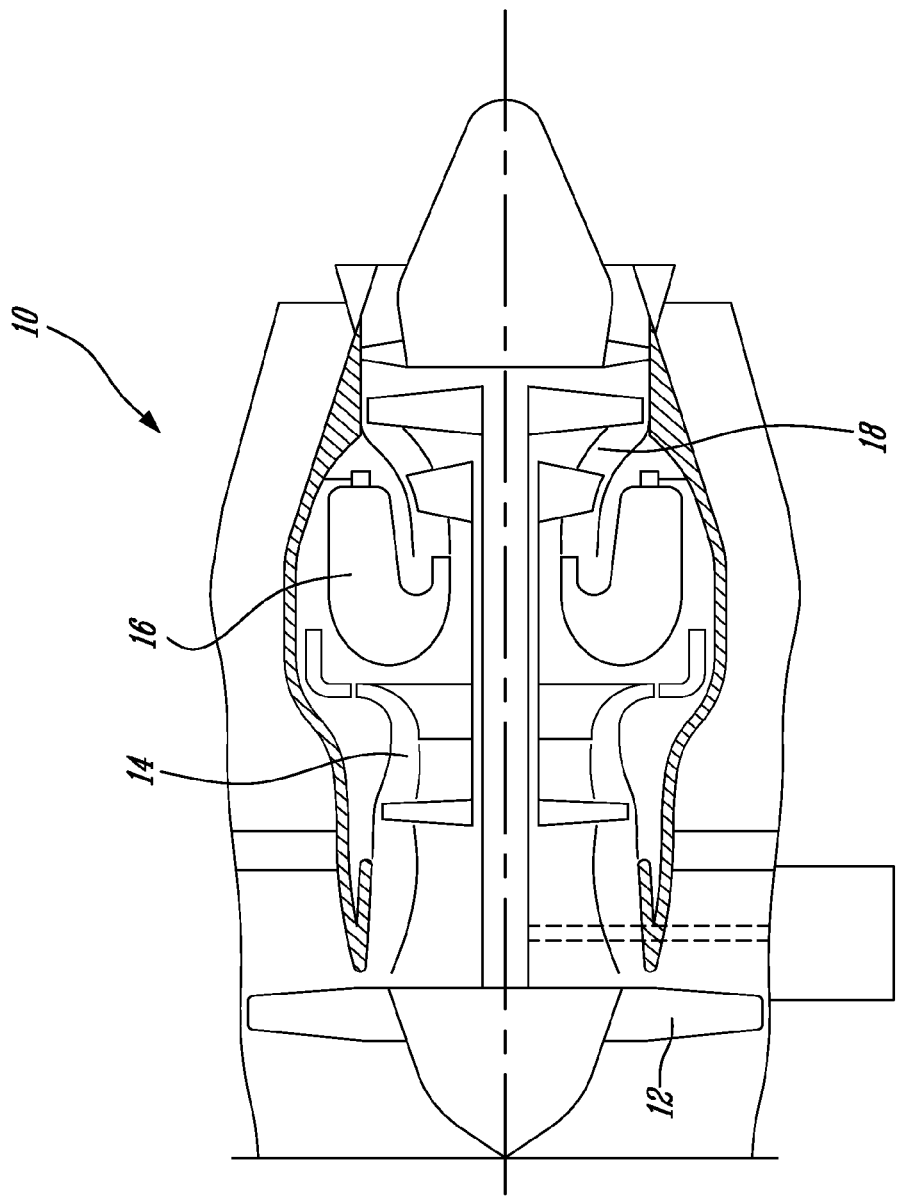
FIG. 1 is a schematic axial cross-section of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. It will be understood however that the invention is equally applicable to other types of gas turbine engines such as a turbo-shaft, a turbo-prop, or auxiliary power units.

Figure 2:
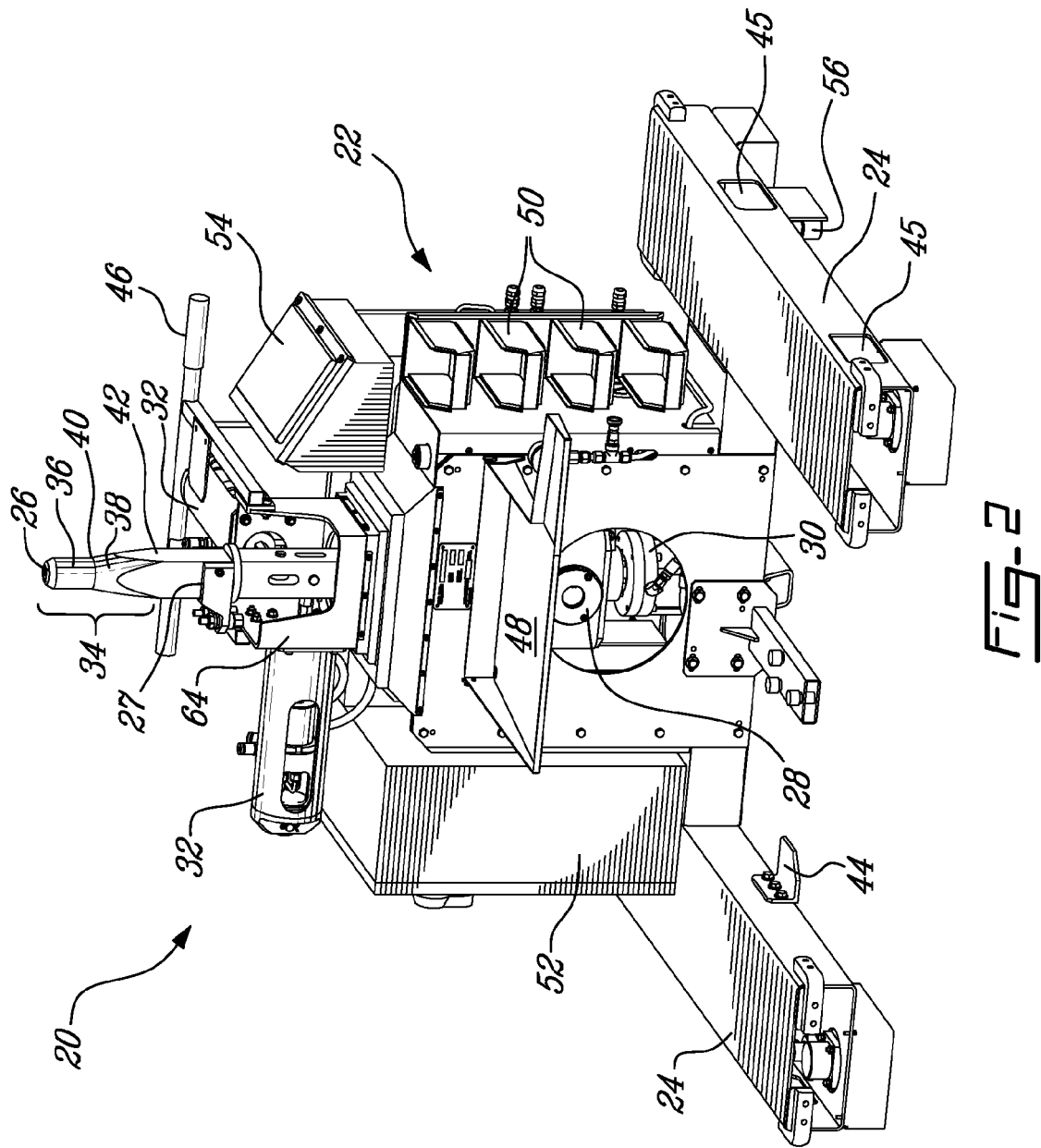
FIG. 2 is an isometric view showing a transport system for transporting a gas turbine engine according to one embodiment of the present invention.

FIG. 2 shows a transport system, shown generally at 20, that is used for transporting the gas turbine engine 10 to and from a build stand, a test cell or a shipping post for example, located within or proximal to a production facility. The transport system 20 is adapted to transport the engine 10 while the gas turbine engine 10 is mounted to an engine docking unit (not shown). The engine docking unit may comprise pre-dressing equipment and accessories for coupling to the gas turbine engine 10 that are required for testing and evaluation of the gas turbine engine 10. Accordingly, the gas turbine engine 10 may be brought to the text cell in a "pre-dressed" condition in order to minimize the down time of the test cell.

The transport system 20 comprises a movable support frame 22 having floor engaging members 24. An actuated support member 26 is pivotally connected to the support frame 22 in an upright position via a gimbal joint 28 and a pneumatic actuator 30. The actuated support member 26 is also movable connected to the support frame 22 via two actuator assemblies 32. The transport system 20 also comprises a conventional on-board hydraulic and pneumatic system which is partially shown in FIG. 6 and is used to power the various actuators on the transport system 20.

An upper portion of the support member 26 comprises a male mounting surface 34 which is adapted to mate to a counterpart mounting surface on the engine docking unit and is used to removably secure the engine docking unit to the transport system 20 in a single action. The male mounting comprises a cylindrical portion 36 and a tapered portion 38. The tapered portion 38 has an upper circular cross-section 40 and a lower square cross-section 42. The lower square cross-section 42 of the tapered portion 38 serves as preventing rotation of the engine docking unit relative to the support member 26, and, therefore any non-circular cross-section such as oval or polygonal could also be used. An abutment 27 is provided on the surface of the square cross-section portion 42 for supporting the docking unit against gravity. The top surface of the support member 26 could also offer an arresting or seating surface on which the end wall of the socket of the engine docking unit could rest. However, in the present embodiment, the top surface of the support member 26 is occupied by a reflector (not shown). The reflector is used to trigger a laser sensor (not shown) on the test cell side. The sensor is for fool proofing the installation process. The docking unit can be readily disengaged from the support member 26 in a single operation by axially displacing the docking unit in an upward direction.

The transport system 20 also comprises brackets 44 affixed to each floor engaging member 24 to improve the safety when moving the equipment with a motorized lift truck. These lift trucks typically have narrow sliding forks, which if not properly secured could slide inboard and allow the transport unit to tip off the forks. The brackets 44 increase the width of the lifting surfaces to prevent this possibility. When using a manual pallet lifter this cannot occur, the fork being non-sliding/non adjustable. It is noted that the transport system 20 can be inserted with a pallet truck on all four sides of the base. This is very convenient in small floor space area and sides, for moving engines fitted with intake and exhaust ducts. As shown in FIG. 2, lateral openings 45 are defined in the outboard side of the floor engaging members 24 for receiving the forks of the lift truck, the pallet lifter or the like, thereby allowing the transport system 20 to be laterally engaged. Similar openings are provided at the rear of the base of the transport system 20.

The transport system 20 also has a handle 46 affixed to the support frame 22 that can be used for maneuvering the transport system 20 during taxiing. A shelf 48 and storage boxes 50 for storing fasteners, spare components, sensors or the like associated with the testing or operation of the gas turbine engine 10 are also provided.

The transport system 20 further includes an electrical control box 52 which is used to house a power supply such as a battery (not shown) and various control circuits such as a conventional programmable logic controller (PLC) (not shown) that are associated with the control and operation of the hydraulic and pneumatic system and the various actuators incorporated in the transport system 20. A touch screen user interface 54 is also provided to interface with the PLC and facilitate the operation of the transport system 20.

Figure 3:
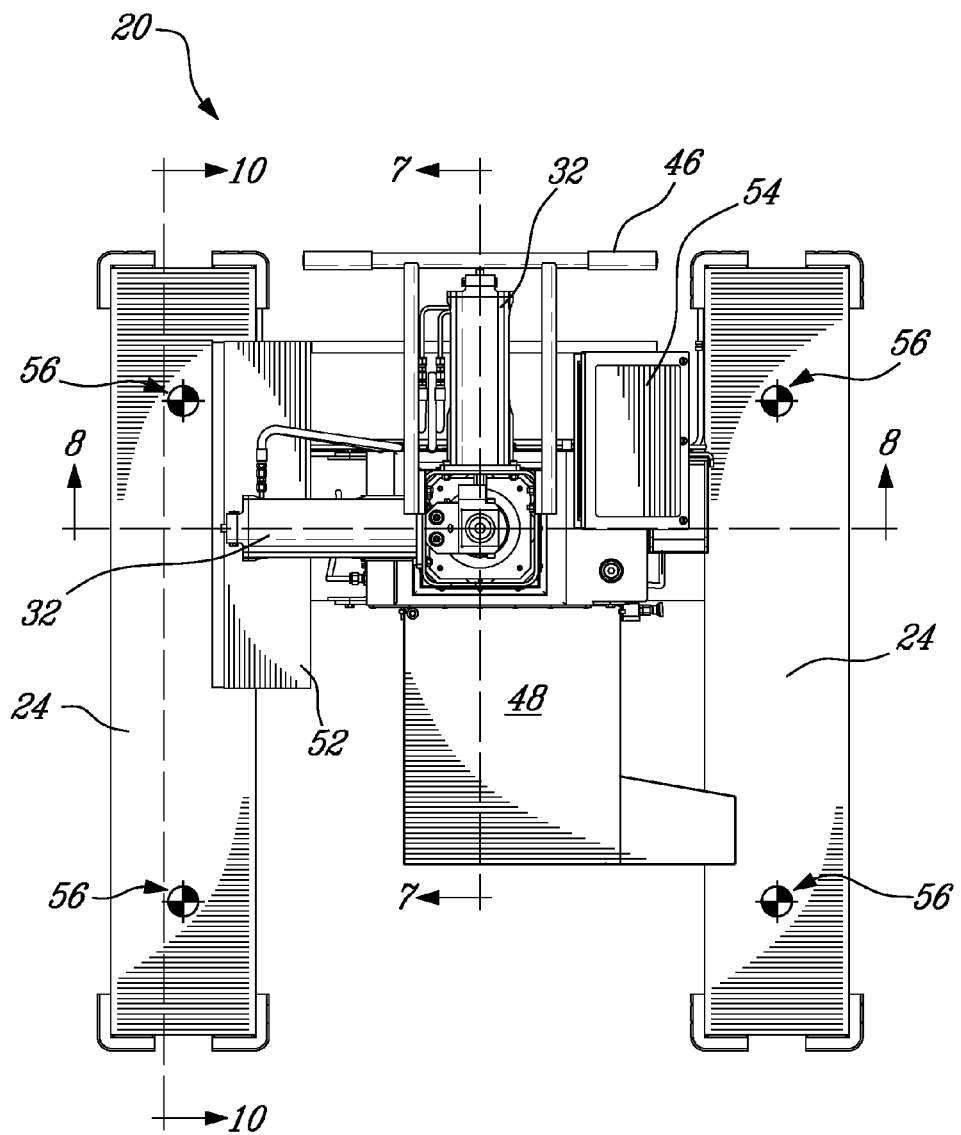
FIG. 3 is a top plan view of the transport system of FIG. 2.
Figure 4:
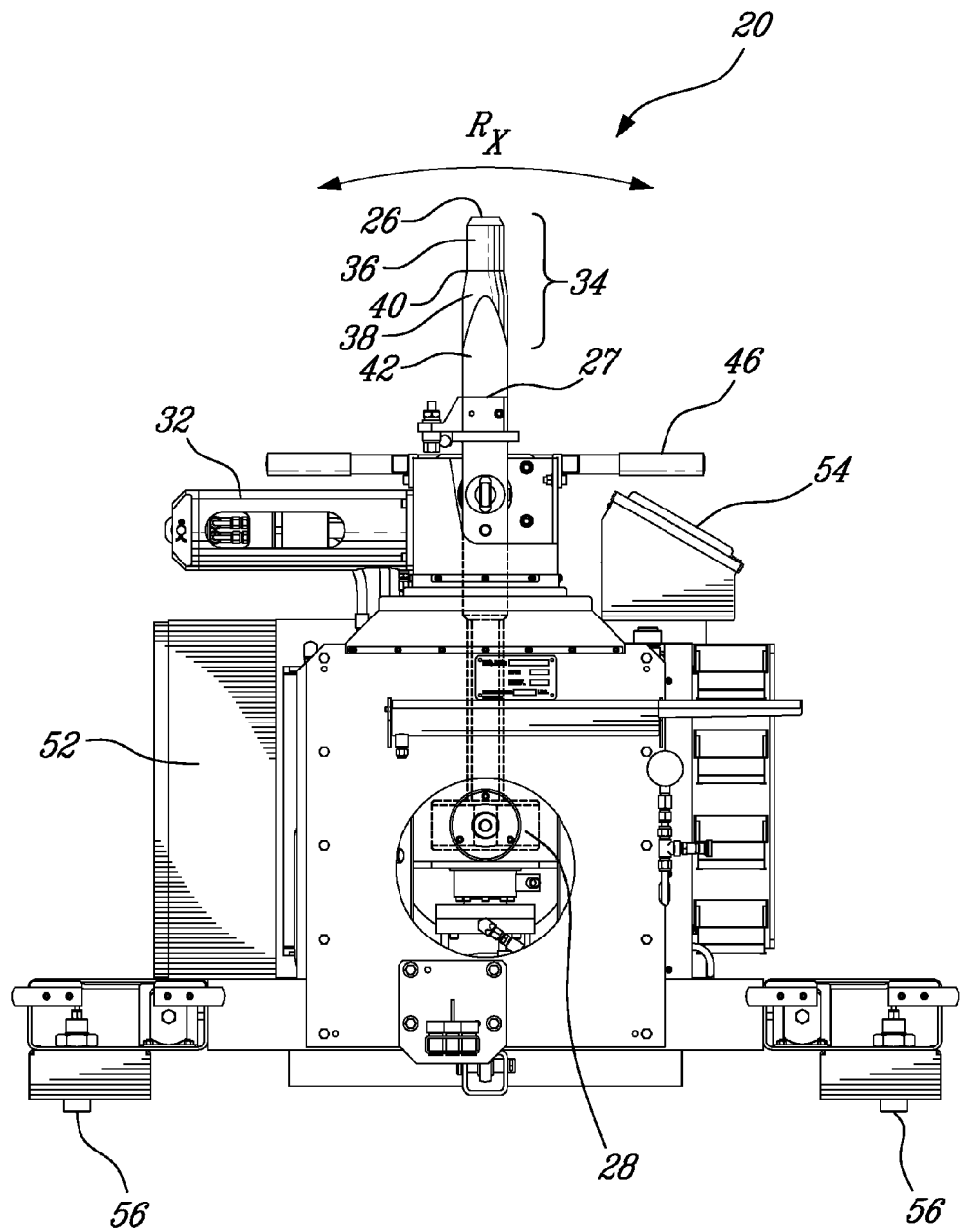
FIG. 4 is a front elevation view of the transport system of FIG. 2.
Figure 5:
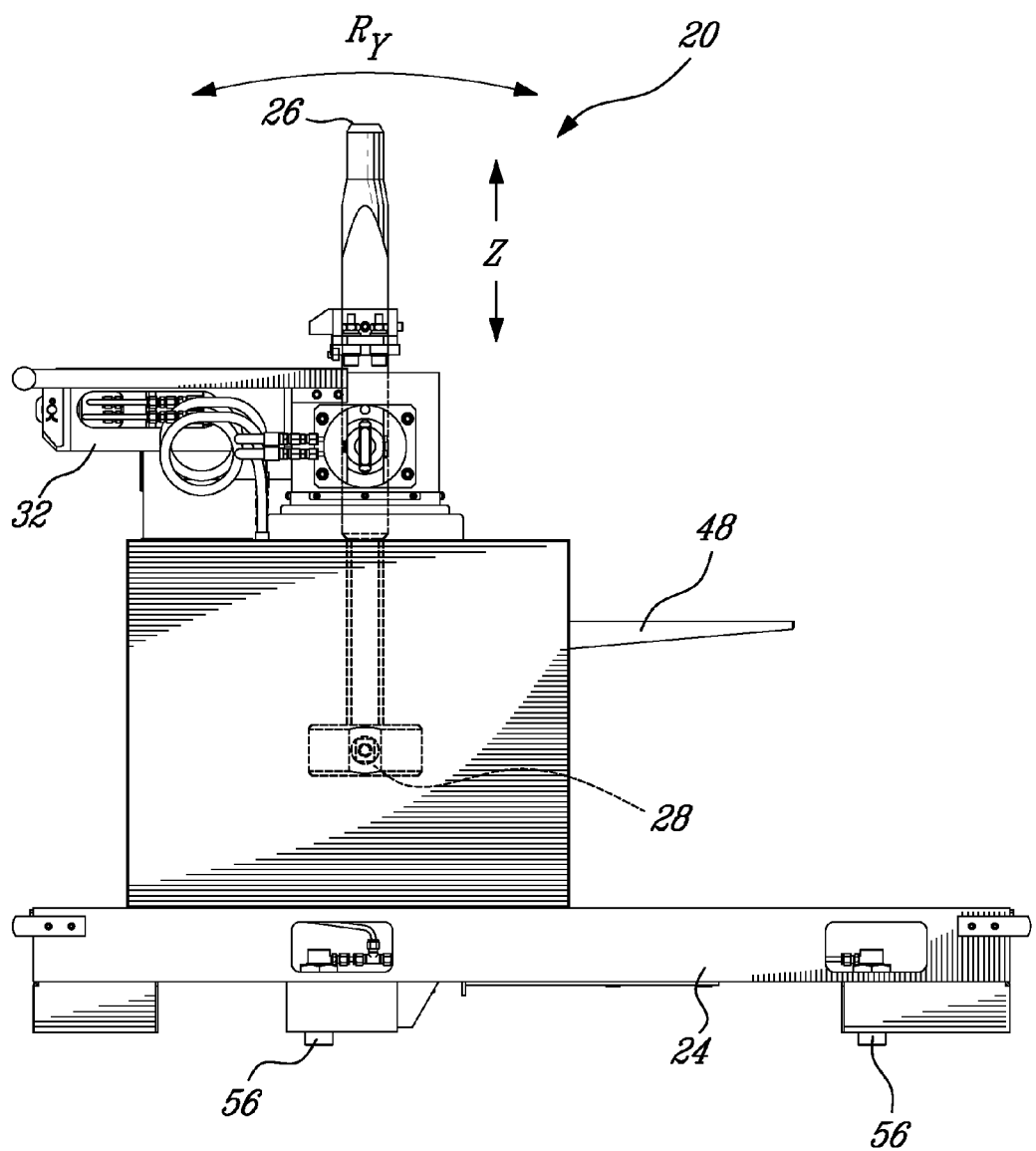
FIG. 5 is a side elevation view of the transport system of FIG. 2.
Figure 6:
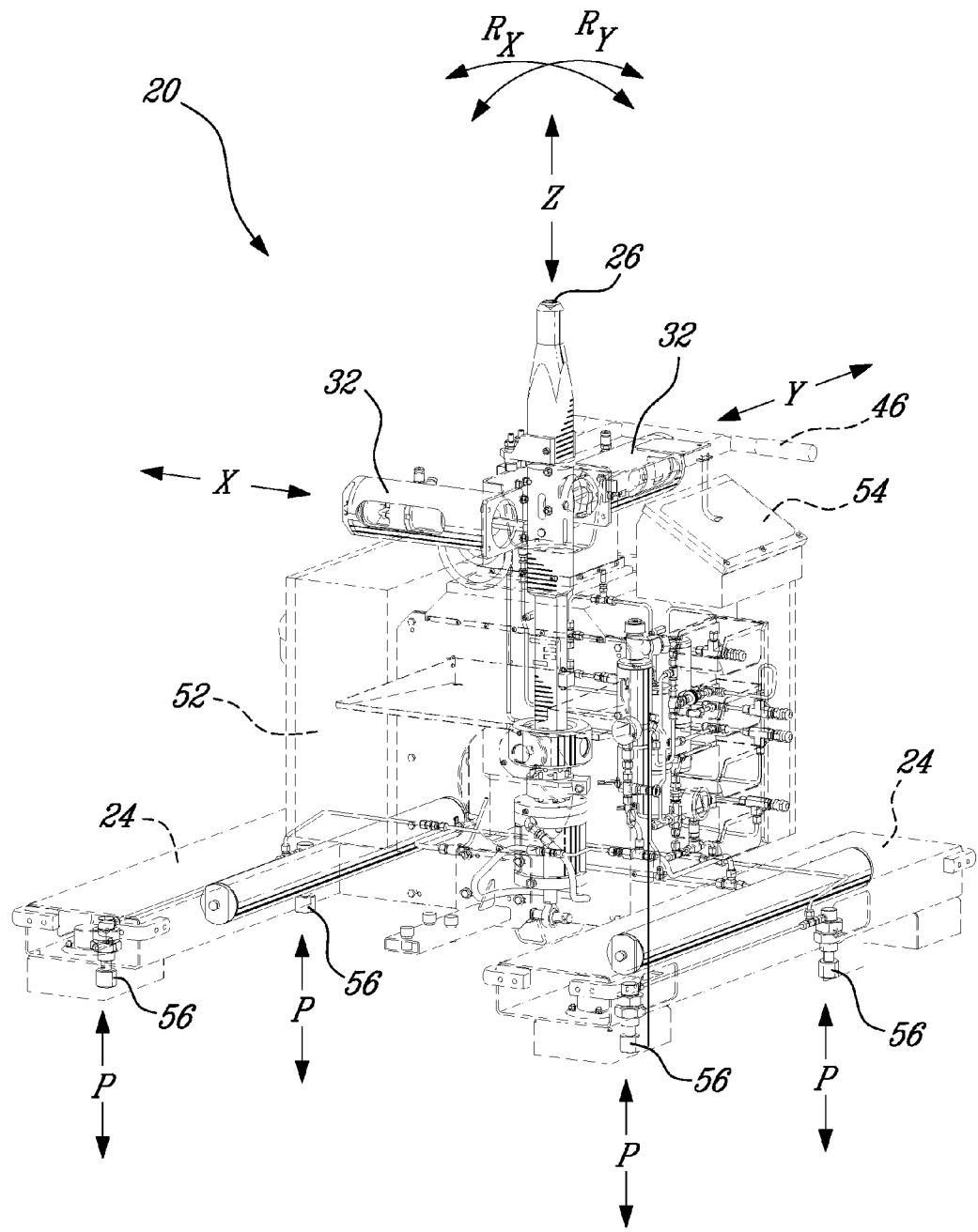
FIG. 6 is an isometric detailed view of the transport system of FIG. 2 showing the directions of movement of various actuators and of a support member.

In reference to FIGS. 2-6, levelling feet 56 are provided on the floor engaging members 24 of the transport system 20. The levelling feet 56 are used to move the transport system 20 up and down in the P direction as shown in FIG. 6 when the transport system 20 is stationary. The levelling feet 56 are powered by the on-board hydraulic system. FIG. 3 shows the layout of the levelling feet 56 in relation to the floor engaging members 24.

FIG. 3 also shows the configuration of the two actuator assemblies 32 that are pivotally connected to the support member 26 and are used to cause rotation of the support member 26 about the gimbal joint 28. FIG. 4 shows the actuator assembly 32 that is used to push and pull the support member 26 along an X axis as shown in FIG. 6. This produces a rotational movement of the support member 26 from the upright position about a Y axis as show by the arrow RX in FIGS. 4 and 6. FIG. 5 shows the actuator assembly 32 that is used to push and pull the support member 26 along the Y axis as shown in FIG. 6. This produces a rotational movement of the support member 26 from the upright position about the X axis as shown by the arrow RY in FIGS. 5 and 6.

Figure 7:
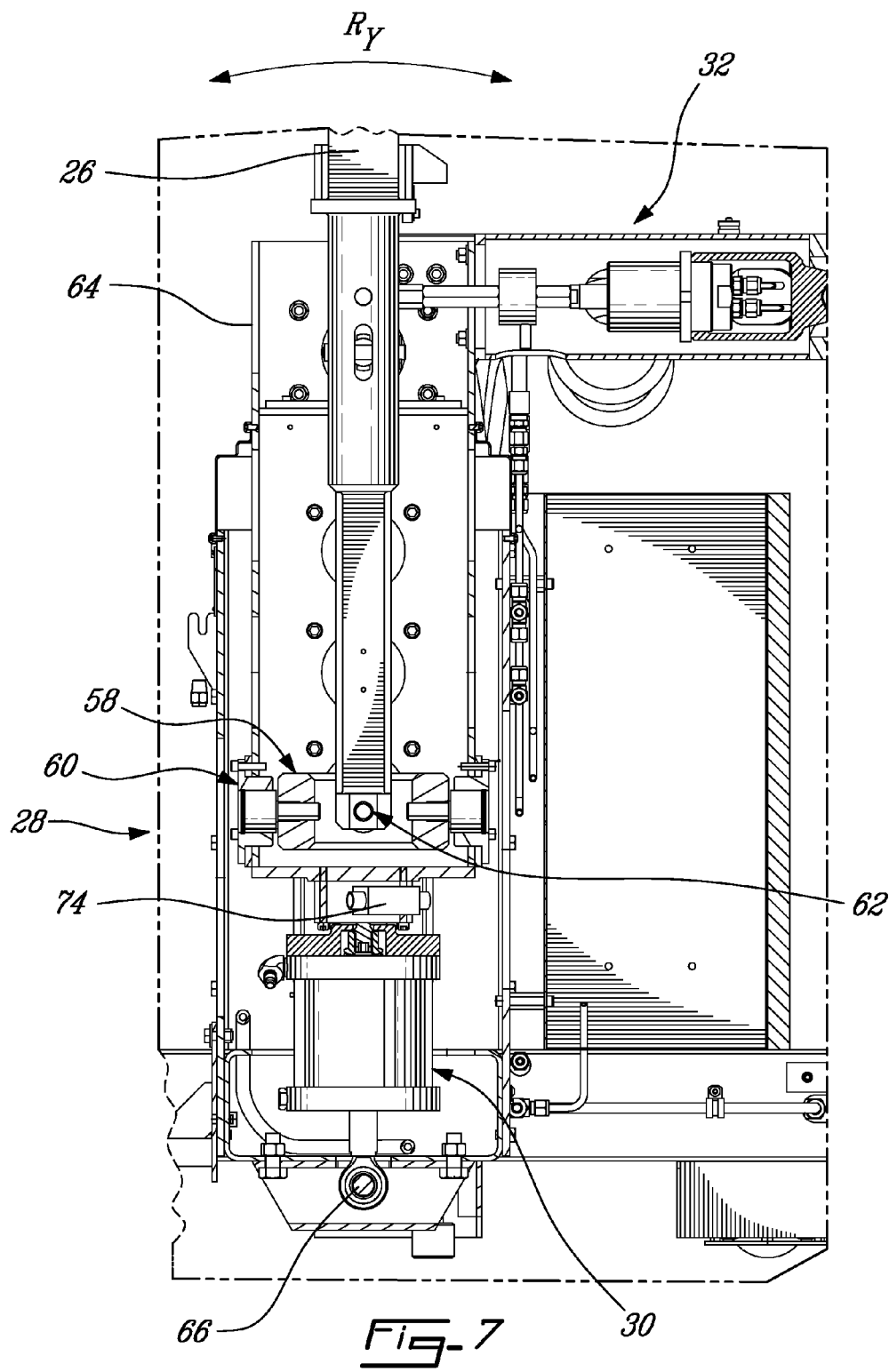
FIG. 7 is a partial cross-sectional side view of the transport system of FIG. 2 along line 7-7 of FIG. 3 showing details of the support member connected to a gimbal joint, a pneumatic actuator and an actuator assembly.
Figure 8:
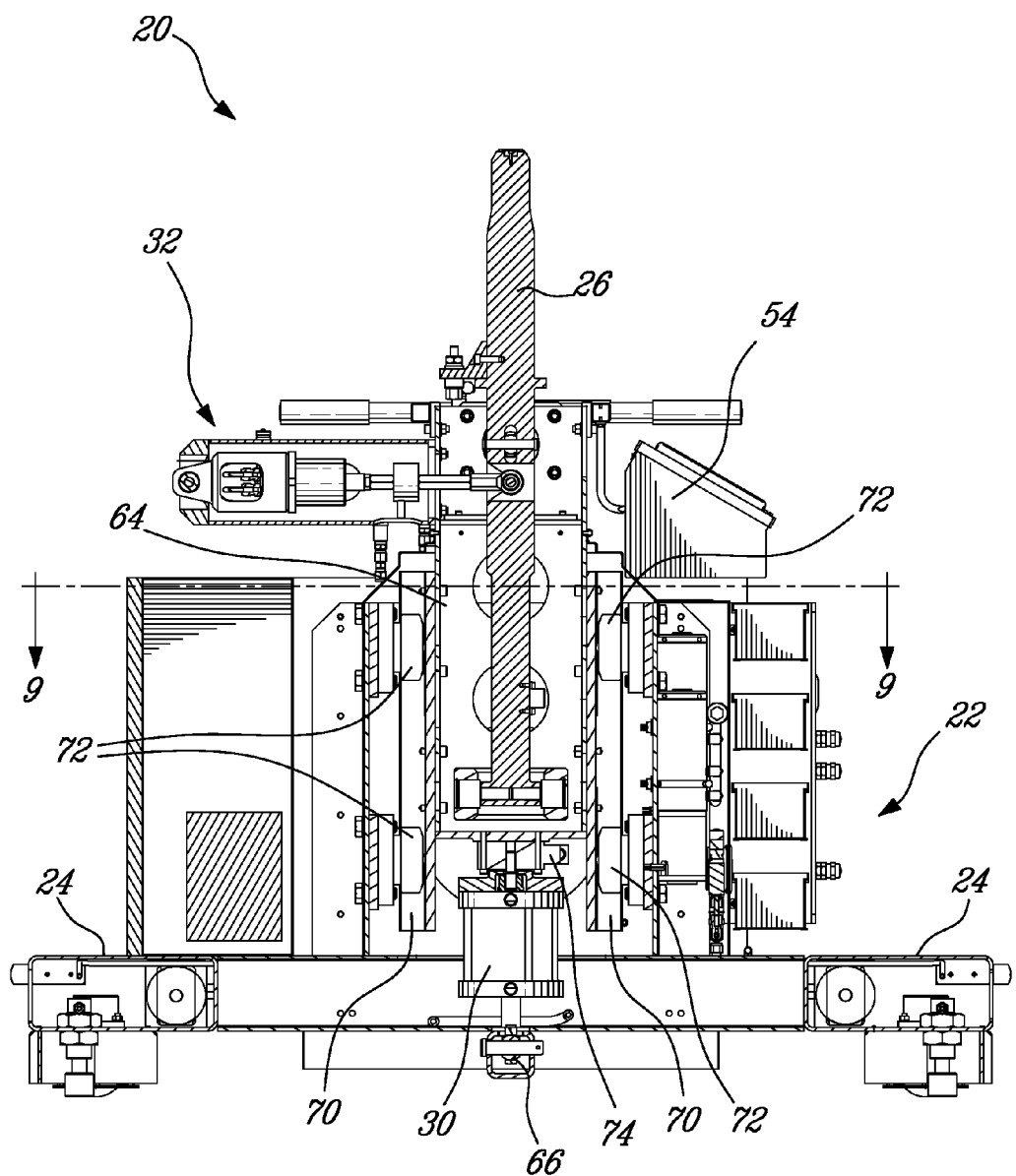
FIG. 8 is a cross-sectional front view of the transport system of FIG. 2 along line 8-8 of FIG. 3 showing details of the support member to the gimbal joint, the pneumatic actuator and another actuator assembly.
Figure 9:
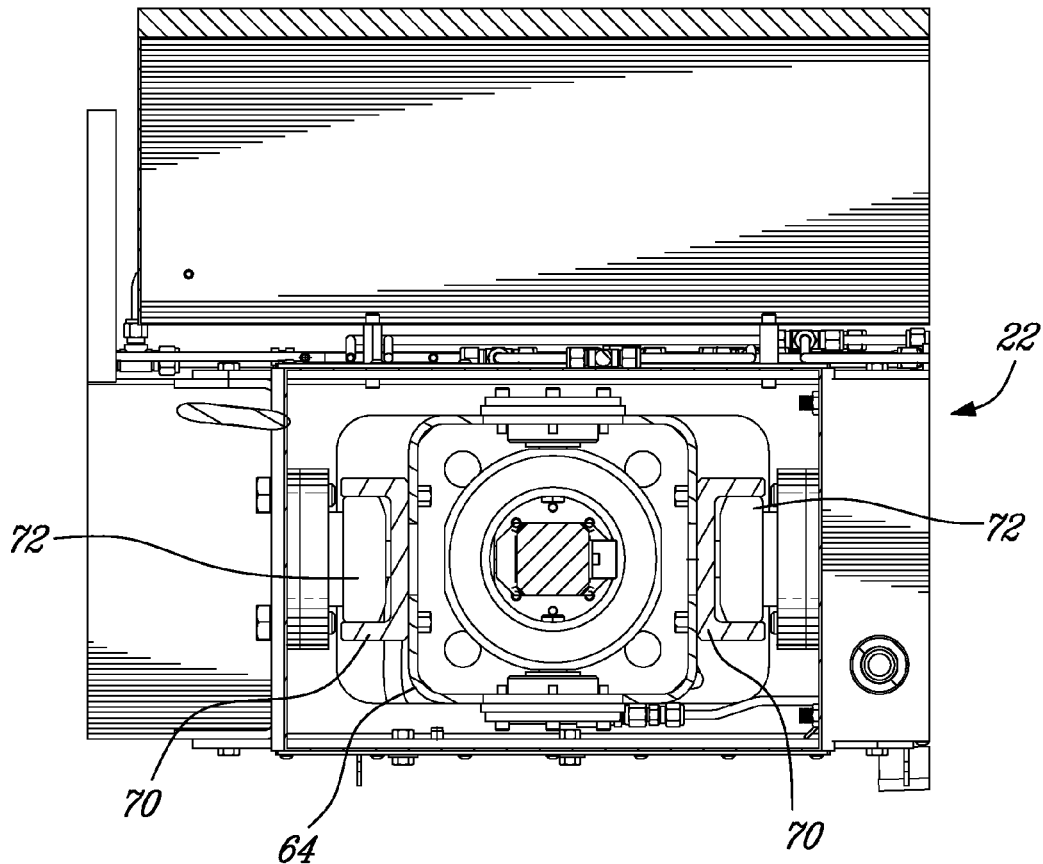
FIG. 9 is a partial cross-sectional view of the transport system of FIG. 2 along line 9-9 of FIG. 8 showing details of a movable support member casing.

FIG. 7 is a partial cross-sectional view along line 7-7 of FIG. 3 and shows details of the support member 26 connected to the gimbal joint 28 and the pneumatic actuator 30. The gimbal joint 28 comprises a gimbal 58 and a trunnion 60. A lower portion of the support member 26 is pivotally connected to the gimbal 58 at pivot point 62 to permit rotation of the support member 26 about the X axis RY. The gimbal 58 is in turn pivotally connected to the trunnion 60 to permit rotation of the support member 26 about the Y axis RX. The trunnion 60 is affixed to a casing 64 which is movable along the Z axis within the support frame 22. The pneumatic actuator 30 is connected between a bottom side of the casing 64 and the support frame 22 at anchor point 66. The pneumatic actuator 30 provides support for the casing 64 together with the support member 26 and also causes the casing 64 and the support member 26 to translate upwardly and downwardly along the Z axis. As shown in FIGS. 8 and 9, parallel rails 70 are provided on each side of the casing 64 to guide the motion of the casing 64 along the Z axis. The rails 70 have a C-shape profile and are adapted to receive and move against bearing members 72 which are affixed to the support frame. A load cell 74 is also connected in series within the load string of the pneumatic actuator 30 and is used to measure a reaction force on the support member 26 along the Z axis.

Advantageously, the pneumatic actuator 30 also provides a pneumatic suspension for the support member 26 and dampens any transportation shocks. The pneumatic actuator 30 further provides resilience for engaging the engine docking unit to static structures such as a test cell.

Figure 10:
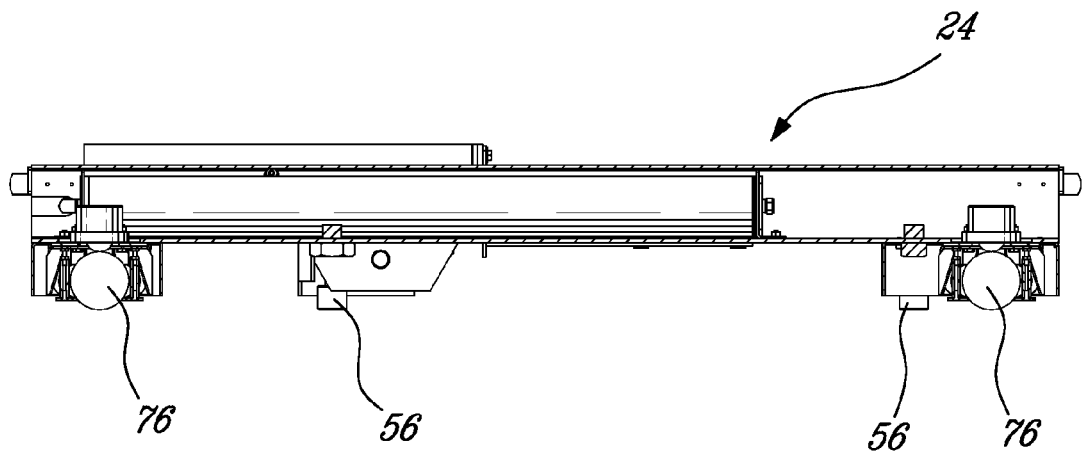
FIG. 10 is a partial cross-sectional view of the transport system of FIG. 2 along line 10-10 of FIG. 3 showing details of a floor engaging member comprising ball casters.

FIG. 10 shows a cross-sectional view of one of the floor engaging members 24 and shows ball casters 76. Two ball casters 76 are provided at opposed end portions of each floor engaging member 24 and can be used to taxi the transport system 20 along relatively smooth floor surfaces. The ball casters 76 allow easy movement in all directions with equal resistance. Alternatively, the ball casters 76 can also ride within a guide rail (not shown) provided in a test cell for example and allow more precise positional adjustments of the transport system 20.

Figure 11:
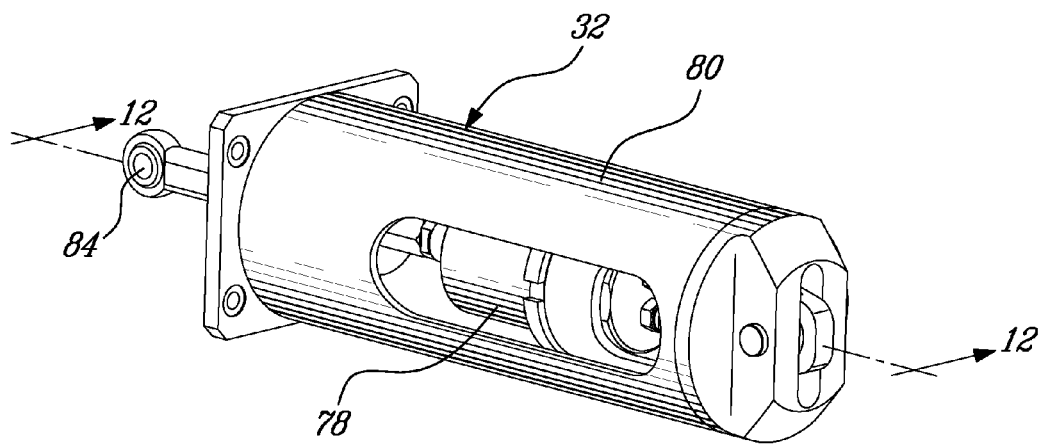
FIG. 11 is an isometric view of the actuator assembly shown in FIG. 7.
Figure 12:
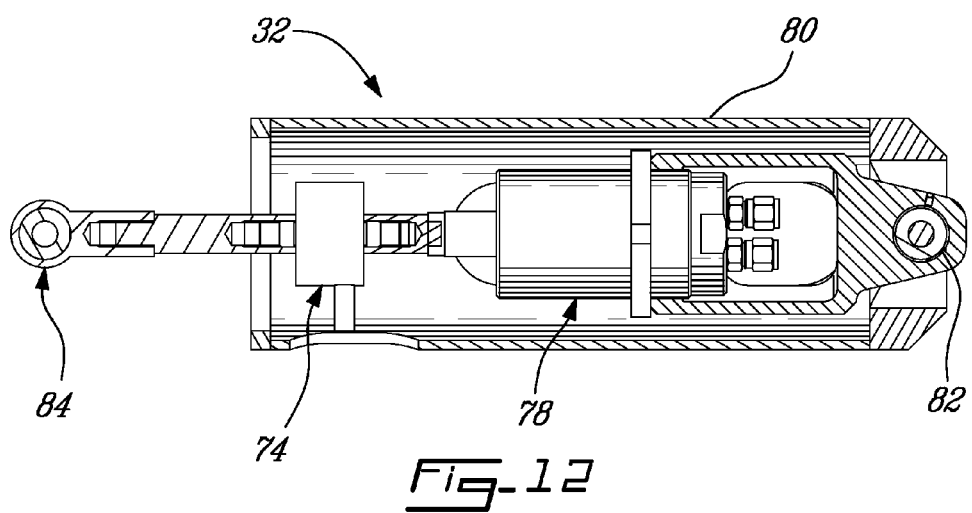
FIG. 12 is an axial cross-sectional view of the actuator assembly of FIG. 11 along line 12-12 of FIG. 11.

FIGS. 11 and 12 show details of one of the two actuator assemblies 32 that are used to cause the support member 26 to rotate about the X and Y axes. Each actuator assembly 32 comprises an actuator such as a hydraulic cylinder 78 and a load cell 74 that are housed within housing 80. The housing 80 is affixed to the support frame 22. The hydraulic cylinder 78 is operatively connected between the housing 80 and the support member 26. The hydraulic cylinder 78 is connected to the housing via a spherical bearing 82 and to the support member 26 via a rod end bearing 84. The load cell 74 is connected in series within the load string of the hydraulic cylinder 78 and is used to measure the reaction force on the support member 26.

Figure 13:
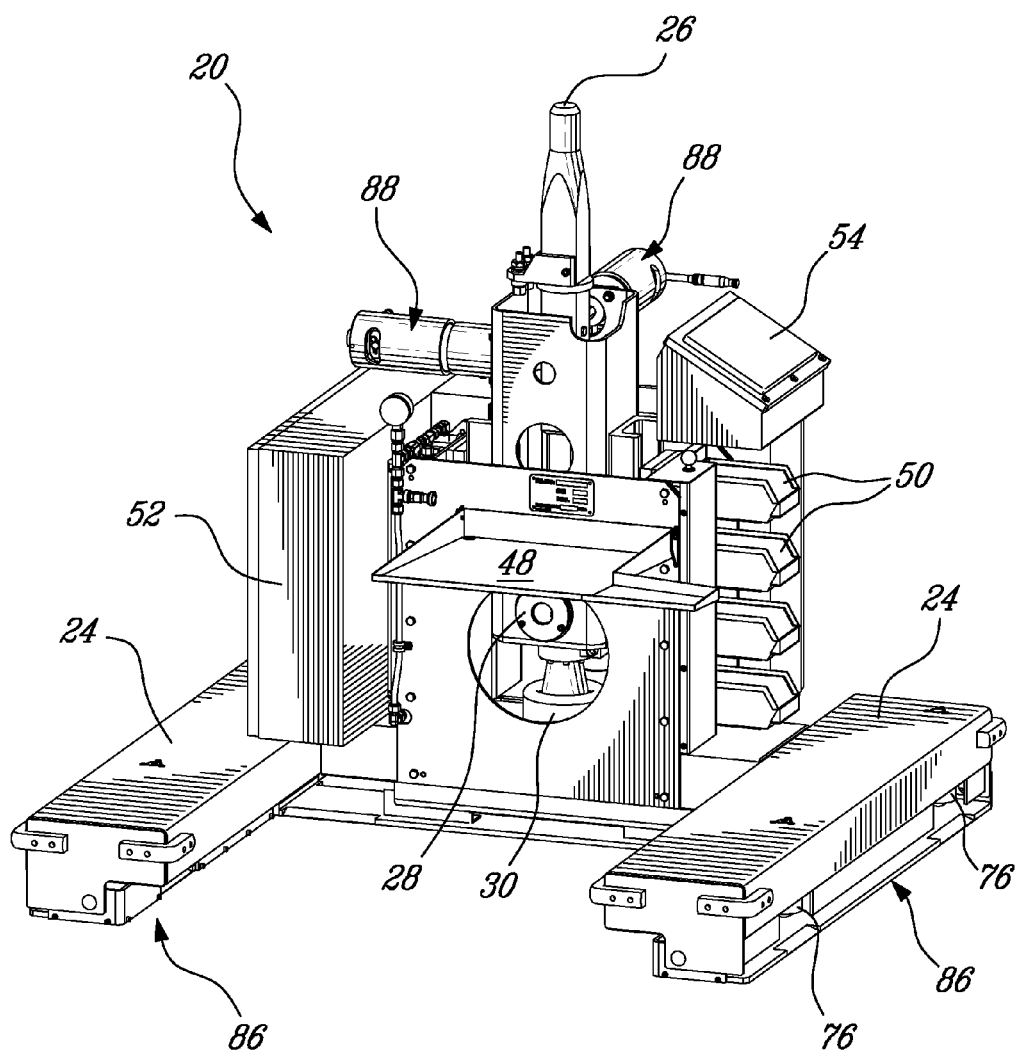
FIG. 13 is an isometric view showing a transport system for transporting a turbine engine comprising a bearing plate, according to another embodiment of the present invention.
Figure 14:
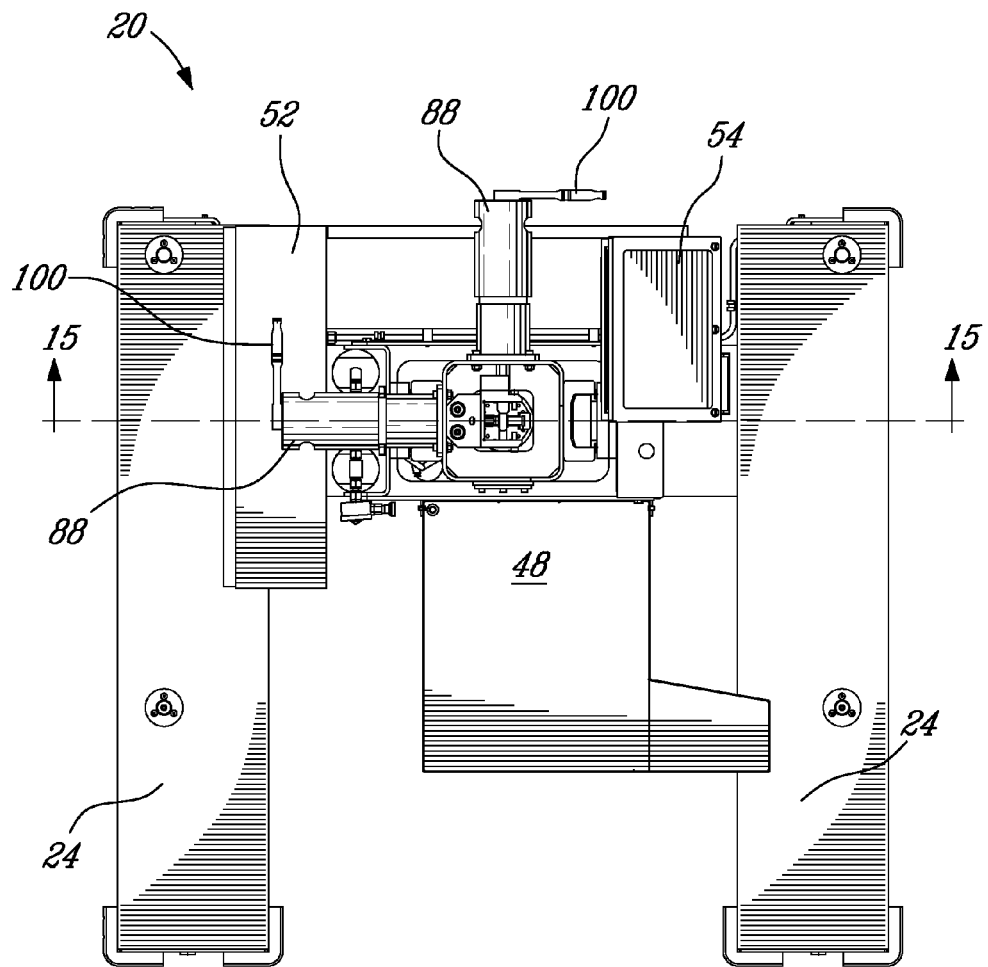
FIG. 14 is a top plan view of the transport system of FIG. 13.
Figure 15:
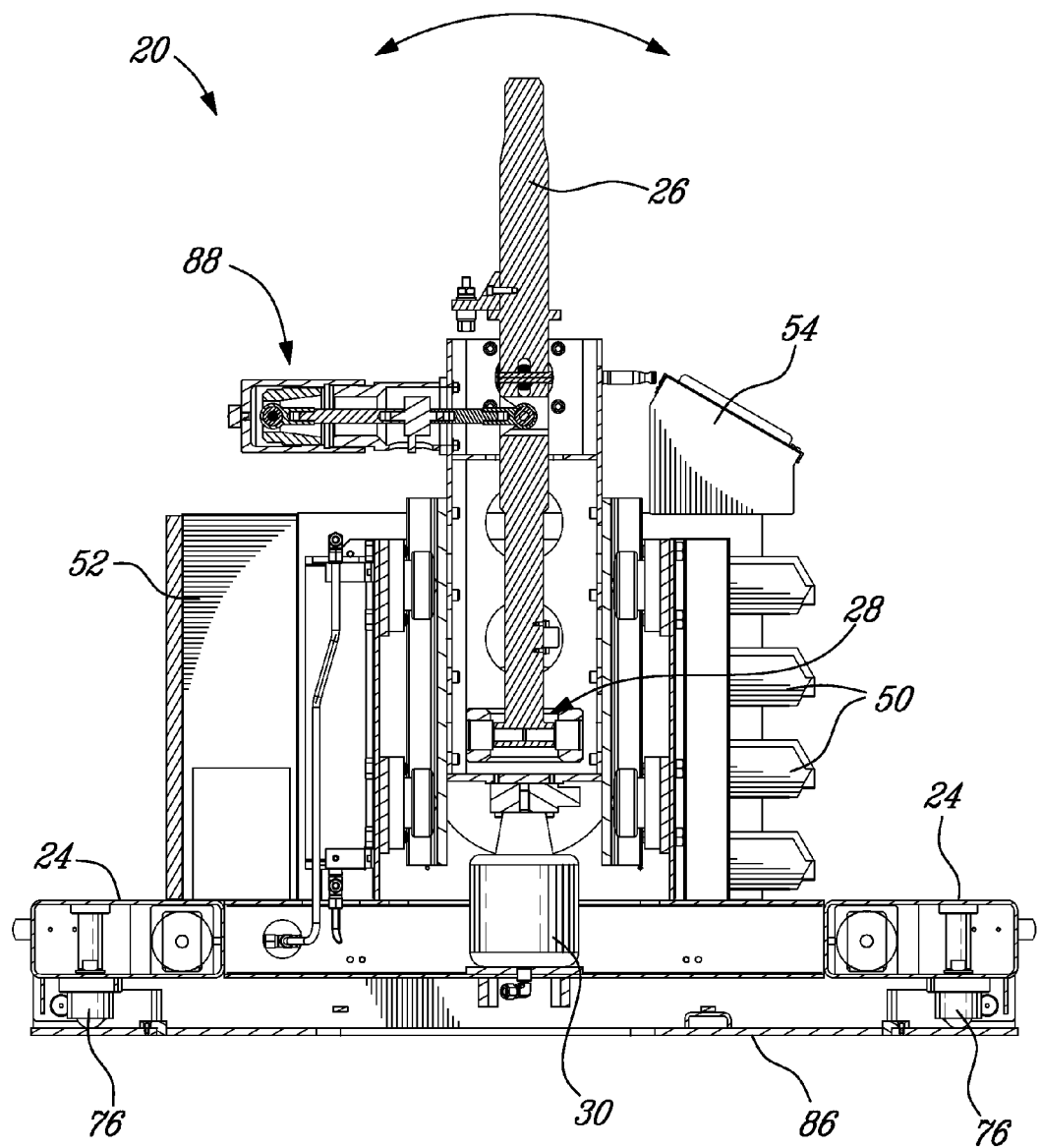
FIG. 15 is a cross-sectional front view of the transport system of FIG. 13 along line 15-15 of FIG. 14 showing details of the support member connected to a gimbal joint, a pneumatic actuator and a manual actuator assembly.

FIGS. 13-15 show a transport system 20 according to another embodiment; in this embodiment the two floor engaging members 24 additionally comprise a bearing plate 86. The bearing plate 86 is rotatably attached to the floor engaging members 24. In this embodiment the floor engaging members 24 have ball casters 76 that are in contact with the inside surface of the bearing plate 86. The inside surface of the bearing plate 86 provides a relatively smooth surface for the ball casters 76 on which to ride. The ball casters 76 allow the entire support frame 22 to be moved and rotated within a limited range relative to the bearing plate 86. The bearing plate 86 is especially useful when the surface on which the transport system 20 is placed is relatively rough and minor positional adjustments are necessary.

Figure 16:
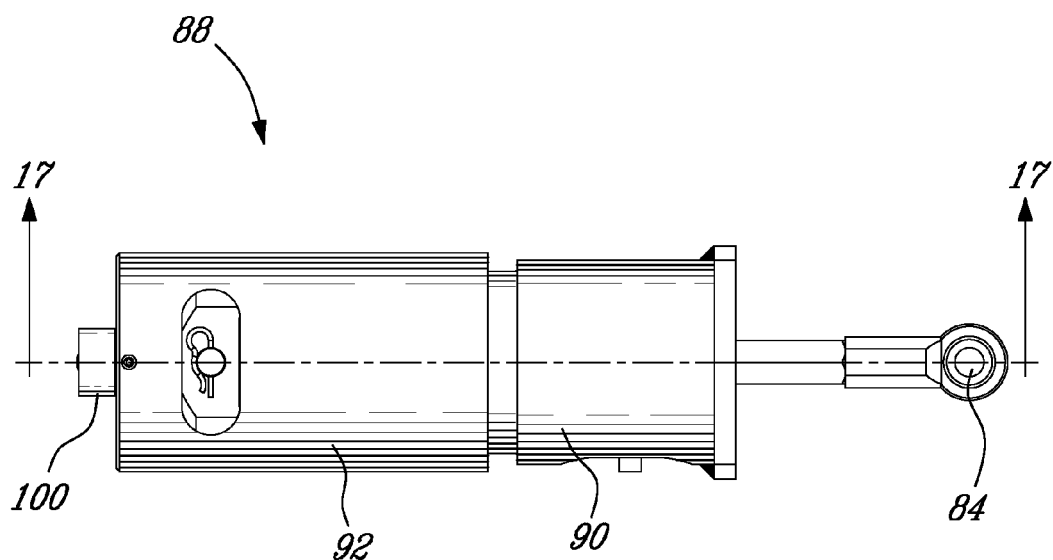
FIG. 16 is a side elevation view of the manual actuator assembly shown in FIG. 15.
Figure 17:
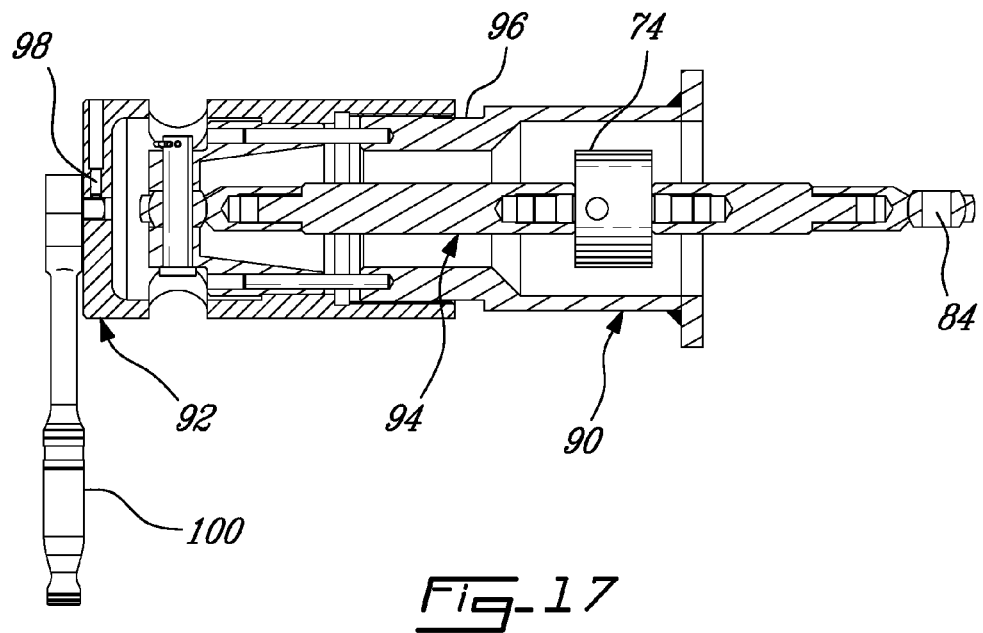
FIG. 17 is an axial cross-sectional view of the manual actuator assembly of FIG. 16 along line 17-17 of FIG. 16.

The embodiment shown in FIGS. 13-15 also comprises manual actuator assemblies 88 instead of the hydraulic actuator assemblies 32. The manual actuator assemblies 88 are shown in details in FIGS. 16 and 17. Each manual actuator assembly 88 comprises a stationary housing portion 90 that is affixed to the support frame 22, a rotatable housing portion 92, a load string 94 and a load cell 74. The rotatable housing portion 92 is threadingly engaged to the stationary housing portion 90 at a threaded interface 96 to form a screw-type linear actuator. The load string 94 is connected between the rotatable housing portion 92 and the support member 26. The load string 94 is rotatably connected to the rotatable housing portion 92 and is connected to the support member 26 via the rod end bearing 84. The load cell 74 is connected in series within the load string 94 of and is used to measure the reaction force on the support member 26.

The rotatable housing portion 92 comprises a square socket 98 to which a ratchet 100 having a square drive can be coupled. The ratchet 100 can be used to turn the rotatable housing portion 92 relative to the stationary housing portion 90. Due to the threaded interface between the rotatable housing portion 92 and the stationary housing portion 90, the relative rotation causes the rotatable housing portion 92 to either move away or towards the stationary housing portion 90 depending on the direction of rotation. This in turn causes the load string 94 to either push or pull the support member 26.

During operation, the transport system 20 may be used to transport the gas turbine engine 10 mounted to an engine docking unit from a build stand where gas turbine engine 10 is assembled for example, to a testing facility for a pass-off test prior to shipping the gas turbine engine 10 to a customer. The engine docking unit may comprise pre-dressing equipment and accessories for coupling to the gas turbine engine 10 that are required for testing and evaluation of the gas turbine engine 10. Accordingly, the engine docking system may be used to interface the gas turbine engine 10 directly to the test cell. The engine docking unit may also comprise engine mounts to which the gas turbine engine 10 is to be secured.

The transport system 20 greatly facilitates the task of transferring the gas turbine engine 10 from the build stand to the engine docking unit. The actuated support member 26 of the transport system 20 allows the engine docking unit to be precisely brought in proximity to the gas turbine engine 10 on the build stand and align the various pre-dressing equipment and engine mounts to their counterparts on the gas turbine engine 10. At this point, an operator can simply and safely make all the necessary connections between the gas turbine engine 10 and the engine docking unit. Once the gas turbine engine 10 has been secured to the engine docking unit, the gas turbine engine 10 can safely be unfastened from the build stand.

The transport system 20 can then be taxied to the testing facility using a floor transport system such as a pallet lifter or using the ball casters 76. At the testing facility, actuated support member 26 allows the engine docking unit together with the gas turbine engine 10 to be precisely manipulated so as to allow the engine docking unit to be docked to the testing cell together with the engine. Once the engine docking unit has been securely docked to the testing facility, either the transport system 20 can be lowered or the engine docking unit can be raised so as to disengage the engine docking unit from the transport system 20 in a single action.

The PLC is adapted to control the hydraulic and pneumatic actuators on the transport system 20 via the touch screen user interface 52. The various load cells 74 are also interfaced to the PLC to inform the operator of the reaction forces on the support member 26 so that the operator can avoid actuating the support member 26 in an unsafe manner. For example, when the hydraulic actuator assemblies 32 are used, it is possible to provide means of limiting the applied forces so as to prevent accidental overloading of turbine engine components during engine transfers. It is also possible for example to verify during engine transfer that the weight of the gas turbine engine 10 is entirely supported by the receiving structure such as the test cell before safely unfastening the gas turbine engine 10 from the transport system 20. By monitoring the reaction loads on the support member 26 through the use of the load cells and the PLC, the support member 26 can be actuated to release the load at the attachment points, to thereby permit safe transfer from and to the transport system. A load monitoring system as provided by the load cells and the PLC or any other suitable load monitoring elements allows the operator to know the magnitude or direction of the loads at the connection points and, thus, provide guidance as to how the actuator must be operated in order to permit the transfer of the engine. For instance, the engine is typically connected to a build stand with two side mounts. These mounts can be provided in the form of a lug and yoke arrangement connected with quick release pins. To enable the pins removal, during the engine transfer process, the shear loads must be removed from the pins. The same applies in the transfer from the transport system to the engine testing stand, and shipping undressing posts.

It is apparent that conventional position sensors such as encoders can readily be integrated into the transport system 20 so as to provide feedback of the angular position of the support member 26 or spatial coordinates of the tip of the support member 26. A typical movement envelope of the tip of the support member 26 would be about ±50 mm (2 inches) along the X axis, +0 to −330 mm (+0 to −13 inches) along the Y axis, from the upright position, and, about ±50 mm (2 inches) along the Z axis. The Y axis being in a rearward direction as shown in FIG. 6. Evidently, the transport system 20 could also be adapted to enable other suitable ranges of motion depending on the application.

It is also apparent that the male mounting surface 34 on the support member 26 could be replaced instead by a female mounting surface adapted to mount to a counterpart male mounting surface on the engine docking unit. Alternatively, the support member 26 could have two male mounting surfaces arranged in a fork configuration that could be used instead of a tapered portion 38 of varying cross section. The fork configuration would prevent relative rotation of the engine docking unit relative to the support member 26. It is clear that such arrangements would evidently produce the same "single action" securing arrangement of the present configuration.

Further, the engine docking unit that is used to mount the gas engine turbine 10 may be any type of framework that is suitable to structurally interface the engine to the movable support frame 22. The examples described above comprises engine pre-dressing equipment but simpler configurations would also work.

The gimbal joint 28 provides pivotal movement of the support member 26 in multiple directions. Accordingly other types of joints providing pivotal movement of the support member 26 about at least two axes could also be used such as for example two separate pivot joints, a ball joint or a universal joint and would be within the scope of the present invention.

The above description is meant to be exemplary only, and one skilled in the art will recognize that changes may be made to the embodiments described without department from the scope of the invention disclosed. It is apparent that the transport system described above can be fabricated using conventional manufacturing procedures using suitable materials such as a structural grade steel or any combinations of suitable materials that would be apparent to a person skilled in the relevant art. It is also apparent that this transport system could also be used to transport and manipulate larger engine parts for the purpose of docking and undocking these parts to an engine core casing in a horizontal engine assembly line and/ or a test cell environment. Still other modifications which fall within the scope of the present invention will be apparent to those skilled in the art, in light of a review of this disclosure, and such modifications are intended to fall within the appended claims.

What is claimed is:

1. A gas turbine engine transport system, comprising:
a support frame movably supported on a floor surface by at least one floor engaging member;
a support member articulated to the support frame, the support member having a mounting portion for releasable engagement with a counterpart mounting portion provided on the gas turbine engine;
at least a first actuator operatively connected between the support frame and the support member for causing the support member to rotate about a first axis;
at least a second actuator operatively connected between the support frame and the support member for causing the support member to rotate about a second axis;
a gimbal joint between the support member and the support frame for allowing rotation of said support member about said first and second axis; and
a load monitoring unit for measuring and providing feedback on reaction forces on the support member.

2. The transport system as defined in claim 1, further comprising a third actuator operatively connected between the support frame and the support member to cause the support member to translate upwardly and downwardly relative to the support frame.

3. The transport system as defined in claim 2, wherein the third actuator is a pneumatic actuator having a line of action which is axially aligned with a longitudinal axis of the support member.

4. The transport system as defined in claim 1, wherein the load monitoring unit comprises a load cell operatively connected between the support frame and the support member.

5. The transport system as defined in claim 1, wherein the support member comprises an upstanding post having an upper end portion on which the mounting portion of the gas turbine engine is adapted to be fitted, and wherein said upper end portion is configured to lock the gas turbine engine against rotational movement relative to the articulated support member.

6. The transport system as defined in claim 1, wherein said support member is pivotally mounted to a casing which is mounted to said support frame for reciprocal movement along a third axis with respect to the support frame.

7. The transport system as defined in claim 1, wherein at least one of the first and second actuators is controlled by a programmable logic controller.

8. The transport system as defined in claim 1, wherein the at least one floor engaging member comprises a bearing plate to which the support frame is rotatably attached to allow rotation of the engine docking unit about a third axis.

9. The transport system as defined in claim 1, wherein the at least one floor engaging member comprises a plurality of ball casters for displacing the support frame on the floor surface, and wherein levelling feet are provided to level the transport system on the floor surface when the transport system is stationary.

10. The transport system as defined in claim 6, wherein the support member is pivotally connected to the casing by the gimbal joint.

11. A gas turbine engine transport system for transporting a turbine engine mounted to an engine docking unit, the gas turbine engine transport system comprising:
a movable support frame supported on a floor surface by at least one floor engaging member;

a support member pivotally connected to the support frame in an upright position wherein the support member is pivotable from the upright position about a first axis and a second axis; an upper portion of the support member having one of a male mounting portion and a female mounting portion mating to a counterpart mounting portion on the engine docking unit, the male and female mounting portions cooperating to prevent angular movements of the engine docking unit relative to the support member while allowing free axial disengagement of the engine docking unit from the support member in an upward direction; and means for pivoting said support member about at least said first and second axes.

12. The transport system as defined in claim 11, wherein the support member is also actuated to translate upwardly and downwardly relative to the support frame.

13. The transport system as defined in claim 11, wherein the male mounting surface of the upper portion of the actuated support member comprises a cylindrical portion and a tapered portion.

14. The transport system as defined in claim 13, wherein the tapered portion comprises an upper circular cross-section and a lower non-circular cross-section.

15. The transport system as defined in claim 11, wherein the at least one floor engaging member comprises a plurality of ball casters and a plurality of levelling feet for levelling the support frame relative to the floor surface.

16. The transport system as defined in claim 11, wherein the at least one floor engaging member comprises a bearing plate to which the support frame is rotatably attached to allow rotation of the engine docking unit about a third axis.

17. The transport system as defined in claim 11, further comprising at least one load cell for providing a feedback representative of a reaction force on the support member.

* * * * *